(12) United States Patent
Logan et al.

(10) Patent No.: US 6,192,178 B1
(45) Date of Patent: Feb. 20, 2001

(54) FIBER OPTIC CABLE WITH PROFILED GROUP OF OPTICAL FIBERS

(75) Inventors: Eric R. Logan; Donald R. Parris; Jason C. Lail, all of Hickory, NC (US)

(73) Assignee: Siecor Operations, LLC, Hickory, NC (US)

( * ) Notice: Under 35 U.S.C. 154(b), the term of this patent shall be extended for 0 days.

(21) Appl. No.: 09/283,080

(22) Filed: Mar. 31, 1999

(51) Int. Cl.⁷ .................................................. G02B 6/44
(52) U.S. Cl. .................... 385/109; 385/110; 385/111; 385/112; 385/114
(58) Field of Search ................................. 385/100–106, 385/110, 111, 112, 109, 113, 114

(56) References Cited

U.S. PATENT DOCUMENTS

| 4,078,853 | 3/1978 | Kempf et al. | 350/96.23 |
|---|---|---|---|
| 4,185,887 | 1/1980 | Ferrentino | 350/96.23 |
| 4,878,732 | 11/1989 | Rohner et al. | 350/96.23 |
| 4,984,859 | 1/1991 | Fujigaki et al. | 350/96.24 |
| 5,013,127 | 5/1991 | Bernard | 350/96.23 |
| 5,166,998 | 11/1992 | Patel | 385/114 |
| 5,177,509 | 1/1993 | Zeidler | 385/105 |
| 5,212,756 | 5/1993 | Eoll | 385/114 |
| 5,249,249 | 9/1993 | Eoll et al. | 385/114 |
| 5,293,443 | 3/1994 | Eoll et al. | 385/114 |
| 5,369,720 | 11/1994 | Parry et al. | 385/114 |
| 5,487,126 | 1/1996 | Oestreich et al. | 385/105 |
| 5,531,064 | 7/1996 | Sawano et al. | 57/204 |
| 5,608,832 | 3/1997 | Pfandl et al. | 385/112 |
| 5,857,051 | * 1/1999 | Tavieso et al. | 385/114 |
| 5,862,284 | 1/1999 | Paborn et al. | 385/106 |
| 5,878,180 | 3/1999 | Nothofer et al. | 385/114 |

FOREIGN PATENT DOCUMENTS 0 495 241 A2   7/1992   (EP) .

* cited by examiner

Primary Examiner—Hemang Sanghavi
(74) Attorney, Agent, or Firm—Timothy J. Aberle

(57) ABSTRACT

A fiber optic cable (10) having a tube assembly (20) therein. Tube assembly (20) includes an optical fiber group (22) in a tube (21). Optical fiber group (22) comprises a medial optical fiber subgroup (23) and lateral optical fiber subgroups (24a,24b;25a,25b;26a,26b) adjacent thereto. Subgroups (24a,24b;25a,25b;26a,26b) define a step-like profile for maximizing optical fiber packing density of tube assembly (20) and/or defining a high fiber count cable (10). In an exemplary embodiment, fiber optic cable (10) can include strength assemblies (30) on opposing sides of tube assembly (20) for defining a preferential bend plane in fiber optic cable (10).

23 Claims, 2 Drawing Sheets

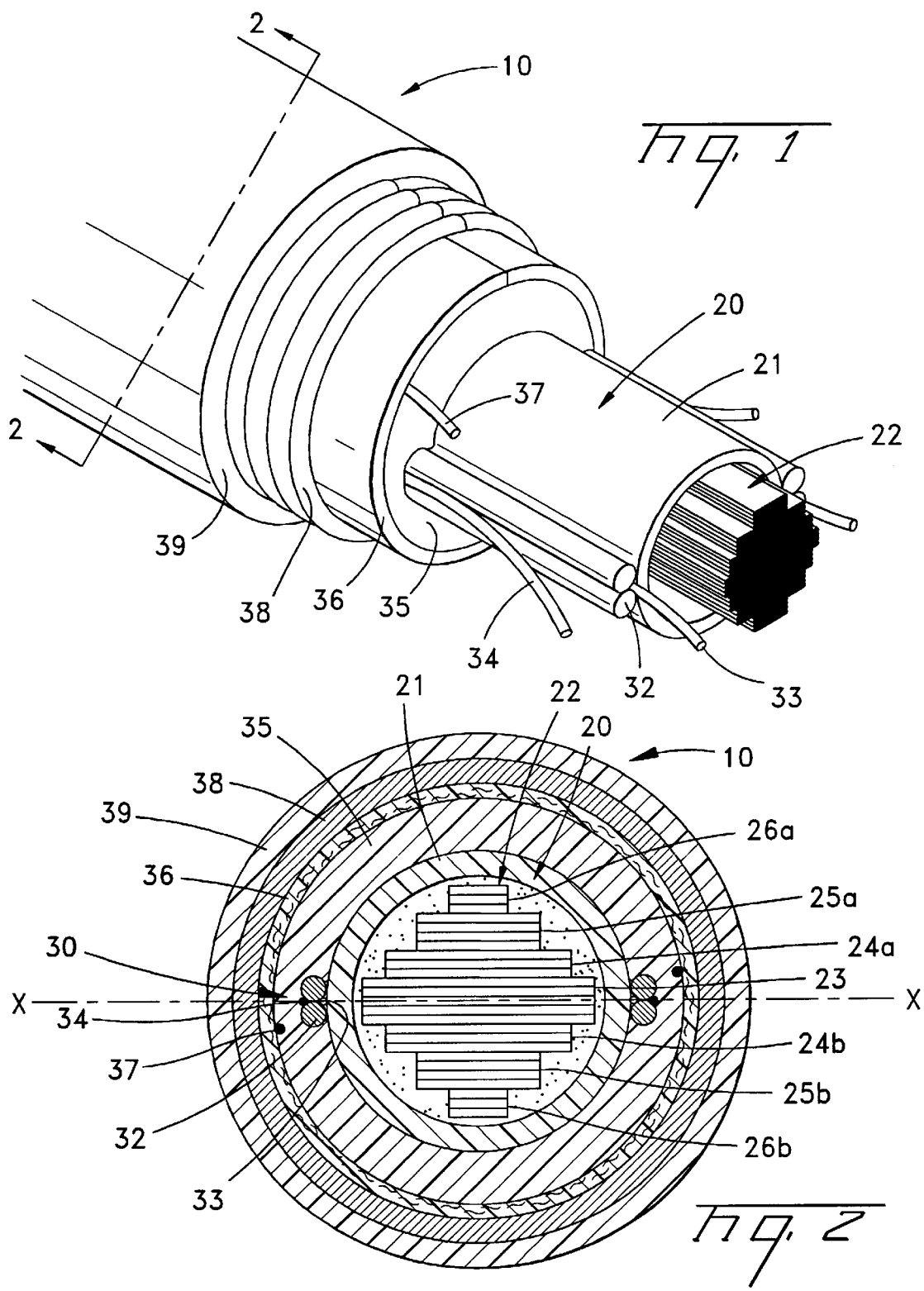

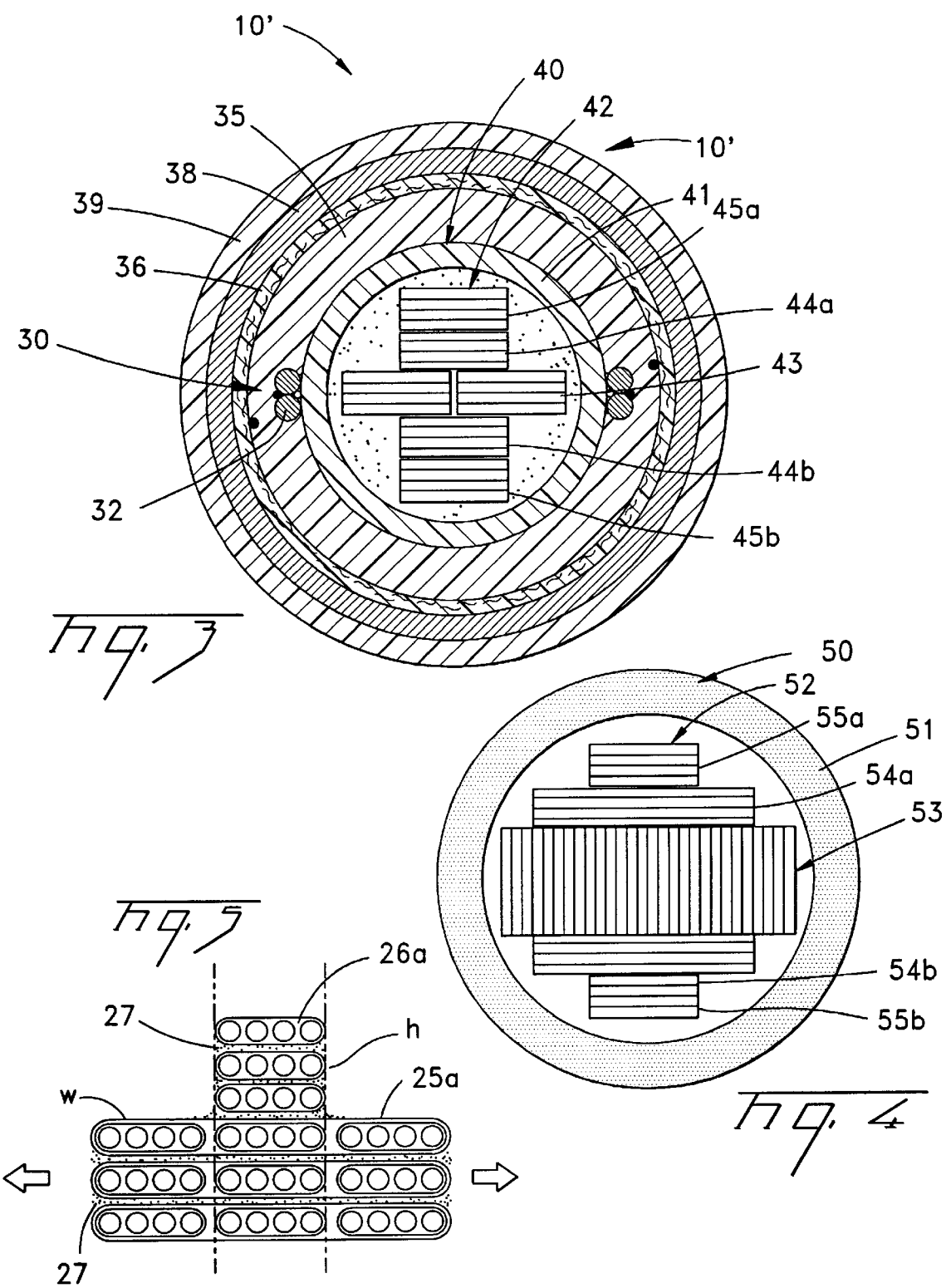

FIBER OPTIC CABLE WITH PROFILED GROUP OF OPTICAL FIBERS

The present invention relates to fiber optic cables, and, more particularly, to fiber optic cables including sets of optical fibers.

BACKGROUND OF THE INVENTION

Conventional fiber optic cables include optical fibers that conduct light which is used to transmit voice, video, and data information. Where the fiber optic cable is subjected to forces, the optical fibers may be stressed and attenuation of the transmitted light may occur. It is therefore important for fiber optic cables to be constructed in a robust manner whereby stress-induced attenuation can be avoided or minimized. In addition, although it is generally desirable for a fiber optic cable to have a high optical fiber count, it is also desirable for the cable to be as compact as possible, thereby maximizing optical fiber density.

High Fiber Count Cables in General

High fiber count cables can be classified into three general design categories, namely: single tube, stranded tube, and slotted core. Each category may include optical fiber ribbons and/or bundled optical fibers. The physical characteristics and/or optical performance of high fiber count cable designs can include, for example: general properties such as packing density, cable diameter, weight and flexibility; cable performance attributes such as environmental performance, mechanical performance, and polarization mode dispersion attributes; and field characteristics such as installation methods, cable stripping, and mid-span access.

BACKGROUND ART

Known cable designs that include optical fiber ribbons, and are classifiable into one of the three general categories, can define a backdrop for the present invention. For example, U.S. Pat. No. 5,608,832 which is incorporated by reference herein, includes a central member. More specifically, the design includes stacks of optical fiber ribbons formed by three optical fiber ribbons disposed in respective three-sided chamber elements of approximately a U-shaped cross section. The chamber elements are stranded around the central member which includes a tensile element and an extruded plastic layer. U.S. Pat. No. 5,249,249 and U.S. Pat. No. 5,293,443 which are respectively incorporated by reference herein, also disclose designs employing central members. The respective disclosures describe a compartment holding at least two side-by-side stacks of optical fiber ribbons.

U.S. Pat. No. 5,177,809 which is incorporated by reference herein, includes a slotted rod. Disclosed therein is an optical cable having a plurality of light waveguides in a group of bands that are arranged in longitudinally extending chambers of a slotted rod. Each of the chambers in the slotted rod can have an increasing width as the radial distance from the center of the slotted rod increases. The bands can be arranged in sub-stacks having increasing widths corresponding to the increased width of the chamber. In another embodiment, each of the bands in the stack has an increasing width in the radial direction to fill the chamber. Alternatively, each of the chambers has a rectangular cross section, with the cross section increasing in a step-like manner due to steps formed in partitions separating the chambers. The bands that are arranged in the chambers are arranged in sub-stacks to fill each portion of the chamber.

The background of the present invention can include single tube cable designs having optical fiber ribbons. For example, U.S. Pat. No. 5,369,720 which is incorporated by reference herein, discloses a stack of optical ribbons secured within a metal tube by an adhesive. The adhesive has a peel strength sufficiently low to permit separation of individual optical ribbons from the stack. One embodiment includes a stack of optical ribbons having a number of ribbons arranged generally parallel to each other, and a further pair of ribbons arranged perpendicular to the generally parallel ribbons and in abutment with edges thereof. In addition, U.S. Pat. No. 5,878,180 discloses a single tube cable including a number of superimposed and adjacent stacks of optical fiber ribbons. The stacks of optical fiber ribbons are arranged over and/or adjacent to each other and in parallel. Another single tube variation, is disclosed in EP-A2-0495241 wherein optical fiber ribbons are tightly received in a zigzagged waterblocking tape. The ribbons are apparently pressed into slots in the zigzagged waterblocking tape. The zigzagged waterblocking tape disadvantageously consumes valuable space inside the tube, increases production costs, requires specialized manufacturing procedures, restricts relative movement of the ribbons during cable bending, increases friction between cable components, and/or adds size and stiffness to the cable.

In addition to attaining a desired fiber count, fiber optic cables should be able to withstand longitudinal compression and tension, and they typically include strength members for these purposes. However, the strength members may disadvantageously affect cable bending performance during installation, and may hinder optical fiber access. A fiber optic cable having strength members located in a single plane generally will experience a preferential bending action favoring bending of the cable out of the plane defined by the strength members. On the other hand, a fiber optic cable having strength members at spaced locations encircling the center of the cable will not have a preferential bend, but the strength members typically include a helical lay so that the cable can be bent. Even taking into account the helical lay of the strength members, when bent in generally any axis, cables of the non-preferential bend type may be very stiff, a characteristic which may be highly undesirable depending upon installation requirements. Thus a cable of the preferential bend type will typically experience ease of cable bending in a preferred plane, and, as there are less strength members to deal with, may present a less time consuming optical fiber access procedure. A cable designer may therefore balance the need to have sufficient cable components for resisting crush, compression, and tension loads, against the size and stiffness contributions of the cable components that may render the cable difficult to install in a cable passageway.

OBJECTS OF THE INVENTION

It is an object of the present invention to provide a fiber optic cable having a tube assembly, the tube assembly comprising: a tube; and an optical fiber group disposed within the tube, the optical fiber group comprising at least one medial optical fiber subgroup, the medial optical fiber subgroup being flanked by at least two optical fiber subgroups on opposing sides thereof defining first lateral optical fiber subgroups, the first lateral optical fiber subgroups being flanked by respective second lateral optical fiber subgroups; the first lateral optical fiber subgroups comprising respective optical fiber counts that are less than an optical fiber count of the medial optical fiber subgroup; sliding contact between at least two of the optical fiber subgroups permits adjustment of the optical fiber group during cable bending.

It is an object of the present invention to provide a fiber optic cable comprising: a set of optical fibers having a gradually decreasing optical fiber count profile comprising at least four optical fiber subgroups surrounded by a tube, the profile being generally symmetrical about a medial optical fiber subgroup of the profile, at least some of the optical fiber subgroups having a lubricant disposed therebetween for enhancing relative movement during cable bending.

It is an object of the present invention to provide a fiber optic cable comprising: a group of optical fibers having a gradually decreasing optical fiber count profile comprising at least two optical fiber subgroups, at least one of the subgroups comprising at least one optical fiber ribbon with a ribbon separation feature therein, an edge of one of the optical fiber subgroups being aligned with the ribbon separation feature.

BRIEF DESCRIPTION OF THE DRAWING FIGURES

FIG. 1 is an isometric view of a fiber optic cable according to the present invention.

FIG. 2 is a cross sectional view of the cable of FIG. 1 taken at line 2—2.

FIG. 3 is a cross sectional view of a fiber optic cable according to the present invention.

FIG. 4 is a cross sectional view of a fiber optic cable according to the present invention.

FIG. 5 is a cross sectional view of a portion of a optical fiber group according to the present invention.

Detailed Description of the Invention

Referring to FIGS. 1–2, a first embodiment of the present invention comprises a tube assembly 20 that includes a tube 21 having an optical fiber group 22 therein. Optical fiber group 22 comprises optical fiber subgroups having respective sets of optical fibers, for example, a set of optical fibers comprises at least one optical fiber ribbon. More specifically, tube 21 can include an optical fiber ribbon group 22 comprising a medial subgroup 23 of optical fiber ribbons with at least one set of lateral subgroups 24a,24b on opposing sides thereof. Lateral subgroups 24a,24b can be immediately flanked by lateral subgroups 25a,25b, and lateral subgroups 25a,25b can be immediately flanked by lateral subgroups 26a,26b.

Lateral subgroups 24a,24b;25a,25b;26a,26b may have respective generally equal fiber counts respectively. For example, the optical fiber count in lateral subgroups 24a,24b can be in the range of about 36 to about 108 fibers, the optical fiber count in lateral subgroups 25a,25b can be in the range of about 24 to about 96 fibers, and the optical fiber count in lateral subgroups 26a,26b can be in the range of about 18 to about 36 fibers. The optical fiber count in medial subgroup 23 can be in the range of about 120 to about 240 fibers. A total fiber count for tube assembly 20 can be in the range of about 228 to about 720 fibers. The subgroups contain at least one respective layer having at least one optical fiber ribbon. A layer in a subgroup can comprise one continuous ribbon or one or more separate ribbons in general edge-to-edge alignment, touching or with gaps between the edges.

Each subgroup can be progressively smaller, for example, starting at the medial subgroup and moving to the lateral subgroups. Optical fiber ribbon group 22 can therefore define a step-like profile that can be generally symmetrical about medial subgroup 23. The step-like profile can define a high fiber packing density by substantially filing up the volume of tube 21 with, for example, sets of optical fiber ribbons.

In other words, the fiber packing density of tube assembly 20 can be optimized by the step-like profile. The individual steps of the step-like profile can include a width w (FIG. 5) of at least about one optical fiber diameter, e.g., about 260 microns (±20 microns), and a height h of at least about one ribbon thickness, e.g., about 290 microns (±20 microns). The width w and/or height h can be constant from step to step, or they become progressively smaller or larger from step to step in the profile (FIG. 1). Further, the width w can be a multiple of a parameter of an optical fiber ribbon, e.g., an integer multiple of a geometric parameter. For example, for facilitating separation of optical fiber subunits from optical ribbon group 22, width w can be roughly equal to the width of an optical fiber subunit within at least one optical fiber ribbon (FIG. 5). Moreover, edges of the subgroups can be aligned with a separation feature of an optical fiber ribbon, for example, a subunit separation area 25b between subunits (FIG. 5), or a separation member embedded in the optical fiber ribbon (not shown).

Tube assemblies including variations of optical fiber ribbon group 22 can be made according to the present invention. For example, a tube assembly 40 (FIG. 3) can be made having an optical fiber ribbon group 42 comprising a medial subgroup 43 of optical fiber ribbons separated by a gap with at least one set of lateral subgroups 44a,44b on opposing sides thereof. Lateral subgroups 44a,44b can be immediately flanked by lateral subgroups 45a,45b having, for example, optical fiber counts that are generally equal to those of subgroups 44a,44b. The subgroups of the present invention can be distinguished from each other by, for example, the number of fibers, subunits, and/or separation features thereof. In addition, a tube assembly 50 (FIG. 4) can be made having an optical fiber ribbon group 52 in a tube 51 comprising a medial subgroup 53 turned on edge with respect to at least one set of lateral subgroups 54a,54b on opposing sides thereof. Lateral subgroups 54a,54b can be immediately flanked by lateral subgroups 55a,55b.

At least some of the optical fiber ribbons and/or subgroups of optical fiber groups 22,42,52 have low frictional characteristics for sliding contact therebetween. For example, certain optical fiber ribbons and/or each ribbon in an entire subgroup 22,42,52 can be separated form adjacent ribbons by a film thickness of a lubricant 27 shown schematically in FIG. 5. Lubricant 27 can be a viscous substance, for example a gel, a liquid, or a grease-like substance any of which permit sliding contact between optical ribbons within a subgroup and/or subgroups 22,42,52. A suitable pre-wet method for applying a lubricant between optical ribbons is disclosed in U.S. Pat. No. 5,348,586 which is incorporated by reference herein. In addition, the optical fiber ribbons or subgroups can be separated by a lubricant comprising a superabsorbent substance dispersed therein. Alternatively, the outer common matrix of one or more optical ribbons can include a non-compatible material, e.g. a silicone containing material, that migrates to the surface thereof for low frictional characteristics. Moreover, low frictional characteristics can be attained without the use of a lubricant or non-compatible substance. For example, one or more subgroups can contain one or more optical fiber ribbons having an advantageously low coefficient of friction matrix material as described in U.S. Pat. No. 5,561,730 which is incorporated by reference herein.

For maintaining stack integrity, optical fiber ribbon groups 22,42,52 can be held together by binders (not shown). Optical fiber ribbons or subgroups can be bonded together with a cured resin, e.g., a UV curable acrylate material. Extrusion of tubes 21,41,51 about ribbon groups 22,42,52 can be accomplished in a buffering line, for example, as disclosed in U.S. Pat. No. 5,312,499 which is incorporated by reference herein. More specifically, optical fiber ribbon groups 22,42,52 can be fed through a device that extrudes tubes 21,41,51 and applies a waterblocking grease therearound. As this occurs, ribbon groups 22,42,52 can be helically twisted as a unit in a lay length in the range of about 200 mm to about 1000 mm along its longitudinal axis. The buffering line can be constructed so that a clearance is defined between optical fiber ribbon groups 22,42,52 and the wall of tubes 21,41,51.

Exemplary Embodiment

Any of tube assemblies 20,40,50 can be used as a component in various fiber optic cable applications. For example, at least one tube assembly 20,40,50 can be stranded about a central member of the kind disclosed in U.S. Pat. No. 5,621,841 which is incorporated by reference herein. Alternatively, at least one tube assembly 20,40,50 can be disposed in a slot of a slotted rod of the kind disclosed in U.S. Ser. No. 08/935,173 which is incorporated by reference herein. Moreover, a tube assembly 20,40,50 can be used to define a core in a mono-tube application.

To illustrate, an exemplary application of tube assembly 20 functioning as a core of a mono-tube type fiber optic cable 10 (FIGS. 1–2) will be described. In addition, tube assembly 40 is shown as the core of a mono-tube type fiber optic cable 10' (FIG. 3). Fiber optic cable 10 includes tube assembly 20 as the core thereof, and one or more strength assemblies 30 are adjacent thereto for resisting bend, crush, and longitudinal compression and tension forces. A typical strength assembly 30, which can be supported by tube 21, includes one or more strength members, and may include portions of a first plastic jacket, an armor tape, and a second plastic jacket. For example, in the embodiments of FIGS. 1–3, and as disclosed in U.S. Ser. No. 08/990,974 incorporated by reference herein, strength assembly 30 may include one or more longitudinally disposed strength members 32, a portion of a first jacket 35, a portion of a corrugated or flat armor tape 38 of the metallic or plastic type, and a portion of a second jacket 39. However, where an armor layer and a second jacket are not required, jacket 35 may comprise the exterior surface of the cable in which case strength assembly 30 would not include those components.

Strength assemblies 30, when located on opposite sides of tube 21, can impart a preferential bend resistance to fiber optic cables 10,10'. A preferential bend plane X—X (FIG. 2) is generally defined by strength members 32. At least one of strength assemblies 30 includes a strength member 32 coupled to first jacket 35; however, all strength members should be coupled to jacket 35. A thin waterblocking layer 36, for example a conventional waterblocking tape, can be disposed between first and second jackets 35,39. Alternatively, waterblocking layer 36 may be a water swellable coating deposited on tape 38. Ripcords 34 and 37 may be placed along strength members 32 and adjacent tape 36, respectively (FIGS. 1–2).

Strength members 32 can be made of a pre-formed metallic material, e.g., steel, or a dielectric material, e.g., glass reinforced plastic. In addition, the preferred material for the strength members is one which produces a minimum of hydrogen at high temperatures. Strength members 32 preferably include a thin coating of a low-modulus thermoplastic resin compound for waterblocking purposes. The resin may include a water swellable material, for example, a superabsorbent substance. A given strength assembly 30 can include two or more strength members 32 that can be coupled to each other by action of the water swellable material, and can be coupled to jacket 35. As an alternative or in addition to the water swellable material, waterblocking yarns 33 may be disposed along strength members 32 (FIGS. 1–2).

Fiber optic cables 10,10' are preferably constructed for outdoor applications. During bending of the cable, optical fiber ribbon group 22,42 can bend about plane X, and the respective subgroups and/or the optical fiber ribbons therein may slide relative to each other for relieving stress in the optical ribbons. Additionally, the clearance between tube 21,41 and optical fiber ribbon groups 22,42 allows for some adjustment in the lay length of group 22 during cable bending. Having four subgroups can allow group 22 to adjust during bending and facilitate termination and/or separation procedures.

The present invention has thus been described with reference to the exemplary embodiments, which embodiments are intended to be illustrative of the present inventive concepts rather than limiting. Persons of ordinary skill in the art will appreciate that variations and modifications of the foregoing embodiments may be made without departing from the scope of the appended claims. Tube assemblies 20,40,50 may be used in a mono-tube fiber optic cable of the non-preferential bend type. Tube assemblies 20,40,50 can include more or less lateral subgroups, and/or no medial subgroup. The step-like profile can include the interposition of a subgroup having a larger or smaller fiber count than neighboring subgroups. Tubes 21,41,51 can comprise a non-round or metallic shape, and/or a jacket with embedded strength members as disclosed in U.S. Pat. No. 4,887,354 incorporated by reference herein. Tubes 21,41,51 can be formed of one or more layers of thermoplastic material, e.g. polyethylene, polypropylene, and/or polystyrene, that is chemically suitable for use with any lubricant, superabsorbent, and/or grease-like waterblocking substance therein. Each ribbon/subunit in a subgroup can be marked for ease of identification even in the event the subgroup shifts during cable bending. Further, the optical fiber subgroups can respectively include generally unequal optical fiber counts (not shown). Optical fiber subgroups can include ribbons with subunits as disclosed in U.S. Pat. No. 5,524,164, and or separable ribbons as disclosed in U.S. Pat. No. 5,442,722, which are incorporated by reference herein. In addition, the optical fiber group can include optical fiber sets other than or in addition to ribbons, for example, fiber bundles, dropcords, zipcords, and/or interconnect cables. Optical fibers that are less bend-sensitive can be placed in predefined locations in a group/subgroup/ribbon for maintaining a low overall attenuation of the fiber optic cable. Tube 21 can be coated or impregnated with a superabsorbent material. At least some of the flanking optical fiber subgroups can be disposed edge-to-edge with respect to each other and/or the medial subgroup.

Accordingly, what is claim is:

1. A fiber optic cable having a tube assembly, said tube assembly comprising:
   a tube; and
   an optical fiber group disposed within said tube, said optical fiber group comprising at least one medial optical fiber subgroup, said medial optical fiber subgroup being flanked by at least two optical fiber subgroups on opposing sides thereof defining first lateral optical fiber subgroups, said first lateral optical fiber subgroups being flanked by respective second lateral optical fiber subgroups;

said first lateral optical fiber subgroups comprising respective optical fiber counts that are less than an optical fiber count of said medial optical fiber subgroup;

said group constructed such that sliding contact exists between at least two of said optical fiber subgroups for permitting adjustment of said optical fiber group during cable bending.

2. The fiber optic cable of claim 1, relative movement between said medial optical fiber subgroup and at least one of said lateral optical fiber subgroups being enhanced by a lubricant generally disposed therebetween.

3. The fiber optic cable of claim 2, said lubricant comprising a viscous substance.

4. The fiber optic cable of claim 1, said first and second lateral optical fiber subgroups having respective optical fiber counts that are unequal.

5. The fiber optic cable of claim 1, said medial and lateral subgroups defining a step-like profile.

6. The fiber optic cable of claim 1, said medial subgroup is on edge with respect to at least one of said lateral subgroups.

7. The fiber optic cable of claim 1, said first and second lateral optical fiber subgroups having respective optical fiber counts that are equal.

8. The fiber optic cable of claim 1, comprising a lubricant with a superabsorbent substance therein.

9. The fiber optic cable of claim 1, comprising a total optical fiber count of about 198 to about 480 fibers.

10. The fiber optic cable of claim 1, relative movement between said medial optical fiber subgroup and at least one of said lateral optical fiber subgroups being enhanced by a non-compatible substance in at least one of said subgroups.

11. The fiber optic cable of claim 1, relative movement between said medial optical fiber subgroup and at least one of said lateral optical fiber subgroups being enhanced by a low friction matrix material.

12. A fiber optic cable comprising:

a set of optical fibers having a gradually decreasing optical fiber count profile comprising at least four optical fiber subgroups surrounded by a tube, said profile being generally symmetrical about a medial optical fiber subgroup of said profile, at least two of said optical fiber subgroups being constructed such that sliding contact exists between at least two of said optical fiber subgroups for permitting adjustment of said optical fiber group during cable bending.

13. The fiber optic cable of claim 12, at least one of said optical fiber subgroups being on edge with respect to at least one other optical fiber subgroup.

14. The fiber optic cable of claim 12, at least two of said optical fiber subgroups comprise respective optical fiber counts that are equal.

15. The fiber optic cable of claim 12, at least two of said optical fiber subgroups comprise respective optical fiber counts that are unequal.

16. The fiber optic cable of claim 12, individual steps of the step-like profile comprising a respective width and height.

17. The fiber optic cable of claim 16, said width being at least about 260 microns (±20 microns).

18. The fiber optic cable of claim 17, said height being at least about 290 microns (±20 microns).

19. The fiber optic cable of claim 18, said width or height being constant from step to step of said profile.

20. The fiber optic cable of claim 19, said width or height changing from step to step of said profile.

21. The fiber optic cable of claim 20, the width being a multiple of a parameter of an optical fiber ribbon of a subgroup.

22. A fiber optic cable comprising:

a group of optical fibers having a gradually decreasing optical fiber count profile comprising at least two optical fiber subgroups, at least a first one of said subgroups comprising at least one optical fiber ribbon with a ribbon separation feature therein, an edge of a second optical fiber subgroup being aligned with said ribbon separation feature in said first subgroup.

23. The fiber optic cable of claim 22, said ribbon separation feature including an optical fiber subunit separation area.

* * * * *